United States Patent [19]
Brouwer et al.

[11] 3,714,649
[45] Jan. 30, 1973

[54] VEHICLE RACE MONITORING SYSTEM

[75] Inventors: Frans Brouwer, Glencoe; Willaim H. Englehardt, Skokie; Frank M. Krempel, Prospect Heights; Robert A. Payne, Des Plaines, all of Ill.

[73] Assignee: Stewart-Warner Corporation, Chicago, Ill.

[22] Filed: May 18, 1970

[21] Appl. No.: 38,017

[52] U.S. Cl. ............... 343/6.5 R, 340/23, 340/38 L, 340/408
[51] Int. Cl. ................................................ G01s 9/56
[58] Field of Search ..343/6 R, 6.5 R, 6.5 LC, 6.5 SS; 340/23, 38 L, 408

[56] References Cited

UNITED STATES PATENTS

| | | | |
|---|---|---|---|
| 3,546,696 | 12/1970 | Waters et al. | 343/65. LC |
| 3,153,232 | 10/1964 | Fletcher et al. | 343/6.5 LC X |
| 3,582,876 | 6/1971 | Carmack et al. | 340/38 L |
| 3,427,614 | 2/1969 | Vinding | 343/6.5 SS |

*Primary Examiner*—Malcolm F. Hubler
*Attorney*—Augustus G. Douvas, William J. Newman and Norton Lesser

[57] ABSTRACT

A completely automatic system for monitoring auto racers or the like. Each vehicle carries a transponder which senses its own passage of a position event such as crossing the start-finish line, entering or leaving the pit area, etc., and transmits a signal indicating same to a track side receiver adjacent that event position on a time shared basis with the transponders of all other vehicles. A master transmitter sends a time divisible sync signal to all of the vehicle transponders and each transponder is adapted to transmit a position event signal during only a predetermined time division of the sync signal. Thr track side receivers feed into a central control unit which is also synchronized with the master transmitter and logs the appearance of its positional event of each vehicle in real time. A clock and a computer are provided so that racing rank, lap speeds, etc., may be determined from the log data. A unique position event occurrence sensing system is also disclosed in which an inductance carried by the vehicle passes through a fluctuating magnetic field, the polarity orientation of which defines the position of the particular event.

20 Claims, 6 Drawing Figures

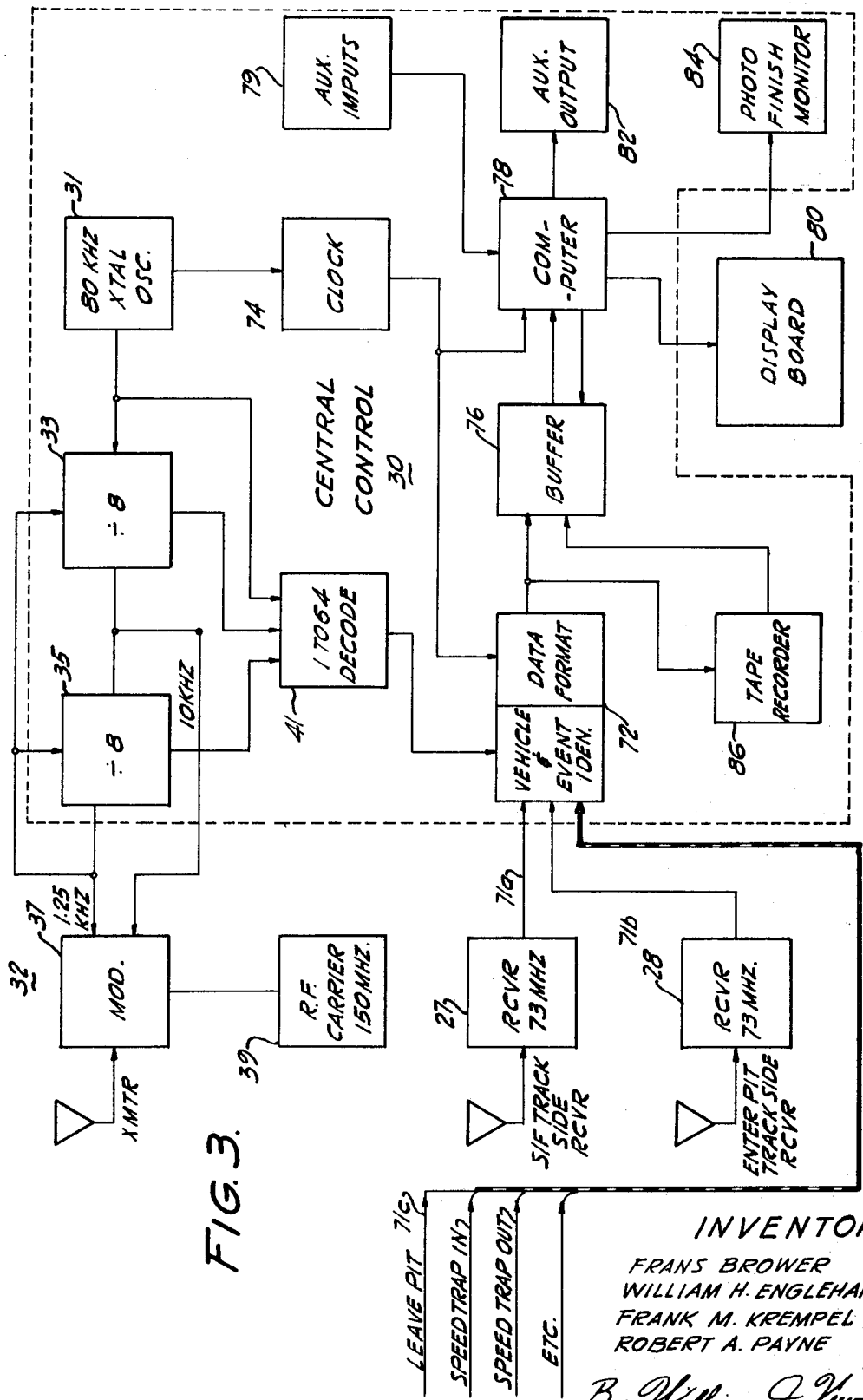

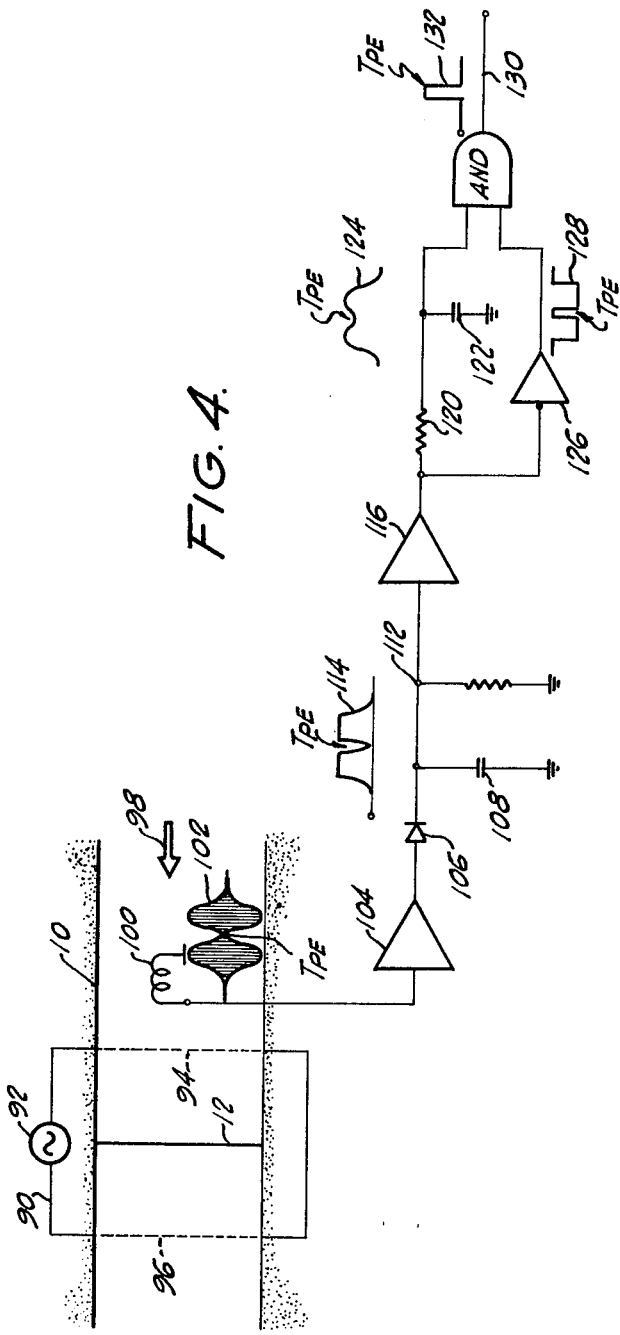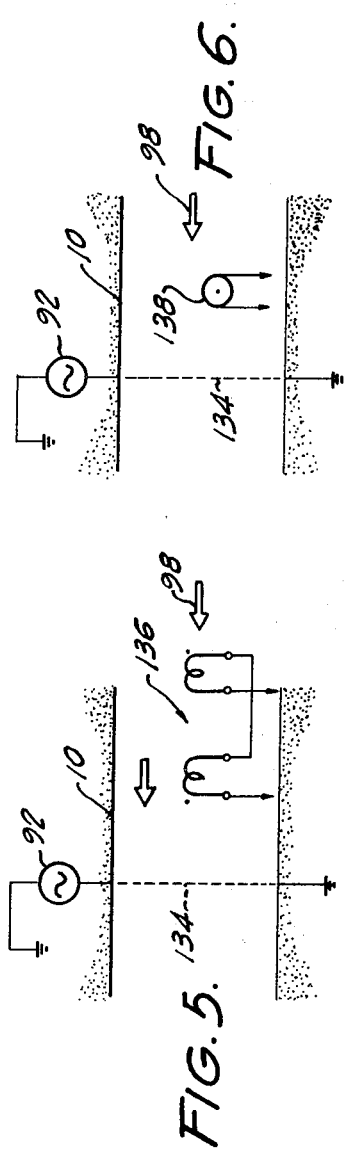

VEHICLE RACE MONITORING SYSTEM

This invention relates to systems for monitoring the occurrences of predetermined positional events of vehicles such as, for example, the arrival or passage of vehicles at predetermined points of observation, and more particularly to systems having novel and improved means for sensing, registering and counting the racing laps of each vehicle as well as computing other data pertinent to the monitoring of vehicle races. Some of the features of this invention may be used in other fields; however, the preferred embodiments and applications are best used in the field of vehicle race monitoring. Accordingly, the invention will be described herein in conjunction with automobile race monitoring systems.

In spite of the great popularity of auto racing dating to the early years of automobile development, the monitoring of races is still being accomplished by the laborious, uneconomical and ofttimes inaccurate means of human observation. For example, to maintain a record of the number of laps of each racing vehicle, officials are assigned the task of officially observing certain cars and maintaining a lap count as the race progresses. Backup observers are required to assure counts are not lost during distractions, and if at the end of the race discrepancies appear in the data, much time and trouble is often encountered in the reconstruction of the data.

Applicants, by the system hereby provided, enable the instantaneous compilation, recording, analyzing and dissemination of race data at any time during or after a race without the necessity of human observers of the racing vehicles. The system is fully automatic with each racing vehicle reporting the occurrence of each positional event during the race by its own unique signals. The system comprises means for defining each positional event along the vehicle path, such as an alternating current energized conductor or loop crossing in race track. Means are carried by each racing vehicle for sensing the positional event, for example, an inductance in which an electric current may be generated by the fluctuating magnetic field surrounding the track loop or conductor. A periodic sync signal is provided by means such as a master transmitter so that each vehicle in the race can separately report the occurrence of positional events on a time sharing basis. Each of the vehicles carries means operative responsive to the sync signal for time dividing the sync signal period and for providing a race body indicating signal during one of the timed divisions unique to that racing body. Further means, such as a vehicle carried transmitter which is operable responsive to the simultaneous occurrence of the racing body indicating signal and the sensing of a positional event of the racing body, provides a real time positional event occurrence signal. The transmitted signal from the vehicle is received by a central control means which logs and computes the data pertaining to the occurrences of the positional events of each racing body.

This invention, its objectives and features, will be best understood by a further reading of this specification, especially when taken in view of the accompanying drawings, in which:

FIG. 3 is a block diagram in greater detail of the master transmitter and central control portions of the system of FIG. 1;

FIG. 4 is a schematic diagram of one embodiment of a positional event indicator, including a positional event sensor and a detector circuit; and FIGS. 5 and 6 are schematic representations of other types of sensors which may be used with a detector circuit such as shown in FIG. 4.

Figure 1:
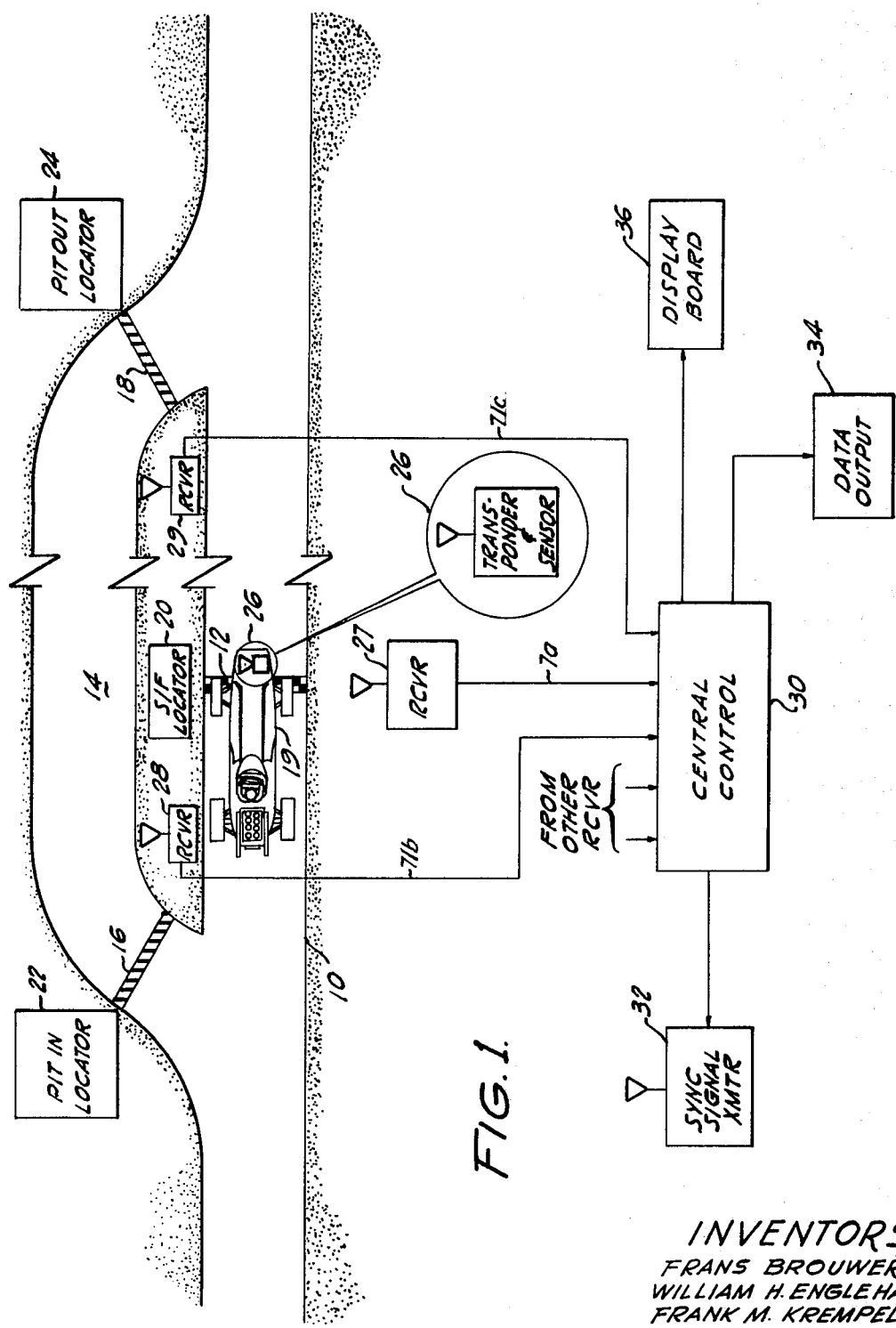
FIG. 1 is a simplified form of a block diagram showing an auto race monitoring system embodying the techniques of this invention.

Referring now to FIG. 1, a portion of an automobile race track 10 is shown with the start-finish line 12, a pit area 14, a pit entry line 16, and a pit exit line 18. The system components shown in FIG. 1 will monitor the positional event of each racing vehicle 19 as it crosses the start-finish line 12 and/or crosses the pit entry line 16 and pit exit line 18. Of course, other events may also be monitored such as the entry and exit of a speed measuring course along the back stretch of the race track or the passage of the vehicles at predetermined check points along the track. However, the manner in which those events would be monitored are the same as the events indicated in FIG. 1, and further descriptions thereof would be repetitive and unnecessary.

Each of the event positions 12, 16 and 18 is defined by a respective event position locator 20, 22, 24 which, as will be explained in more detail later, may take the form of a precisely oriented fluctuating magnetic field generating means which is to be sensed by a transponder 26 carried by each of the vehicles in the race. It is to be understood that in the broadest aspects of this invention other means may be used for defining the positional events such as painted lines on the track or along the side of the track which could be detected by photosensitive means on the vehicles. When the vehicle transponder senses the occurrence of a positional event such as crossing the start-finish line 12, it is caused to transmit a signal to a respective track side receiver 27, 28, 29 which relays it to the central control 30 of the system. Thus, the central control 30 receives an indication from each vehicle in the race whenever it passes one of the position event locators 20, 22, 24.

Provisions, of course, must be made to identify each vehicle reporting that it has crossed one of the position event locators. The vehicle is identified in this system by causing each of the vehicles to respond only during a unique portion of a master controlled time cycle. In other words, a vehicle transponder 26 transmits a signal only when it crosses one of the position event lines 12, 16, 18 and then only during a portion of the master timing cycle which has been assigned to that particular vehicle and no other. The master time cycle is established in each vehicle by means of a sync signal which is transmitted from a master transmitter 32 to the transponders 26 in each of the vehicles 19. The transponder in each vehicle locks on to the sync signal and through means hereinafter described enable a signal to be transmitted to a track side receiver during a unique portion of the sync signal period if the respective vehicle is passing one of the positional events. The central control 30 can then identify the particular vehicle signalling the occurrence of a positional event by determining the particular time slot of the sync signal during which the signal is received. The positional event which occurred is determined by the identification of the particular track side receiver 27, 28, 29 which received the vehicle transmitted signal. The data for each vehicle and position event is lodged in the central control 30 where it is processed and stored for retrieval by the race officials at data output devices 34 or for posting on a display board 36 to inform the spectators.

The master timing cycle is established by a portion of the central control 30 as may be best seen in Fig. 3. A crystal oscillator 31 tuned for example to 80 kilohertz drives the input of a divide-by-eight counter 33 so as to provide a 10 kilohertz signal at its output. Another divide-by-eight counter 35 divides the 10 kilohertz signal so that a 1.25 kilohertz signal appears at its output. The 1.25 kilohertz and 10 kilohertz signals arriving at modulator 37 are caused to modulate an RF carrier from carrier generator 39 and the modulated signal is transmitted by means of a master antenna 43 to the transponders 26 carried by each of the vehicles 20 in the race.

The 1.25 kilohertz signal is utilized as the sync signal which is to be broken up into discrete portions and assigned to separate vehicle transponders. This is accomplished by the divide-by-eight counters 33, 35 and the 1 to 64 decoder circuit 41 which operates in a well known manner to provide 64 separate counts for each cycle of the 1.25 kilohertz sync signal. Each vehicle is then assigned a separate one of the counts from the decoder 41. The 1.25 kilohertz signal is also used to reset the divide-by-eight counter 33, 35 to zero at the beginning of each cycle to establish a proper relationship between the counting cycle and the 1.25 kilohertz sync signal. The 64 counts from the decoder 41 are utilized to identify each vehicle with the position event occurrences registered for the other circuits of the central control, as will be described in more detail hereinafter.

Figure 2:
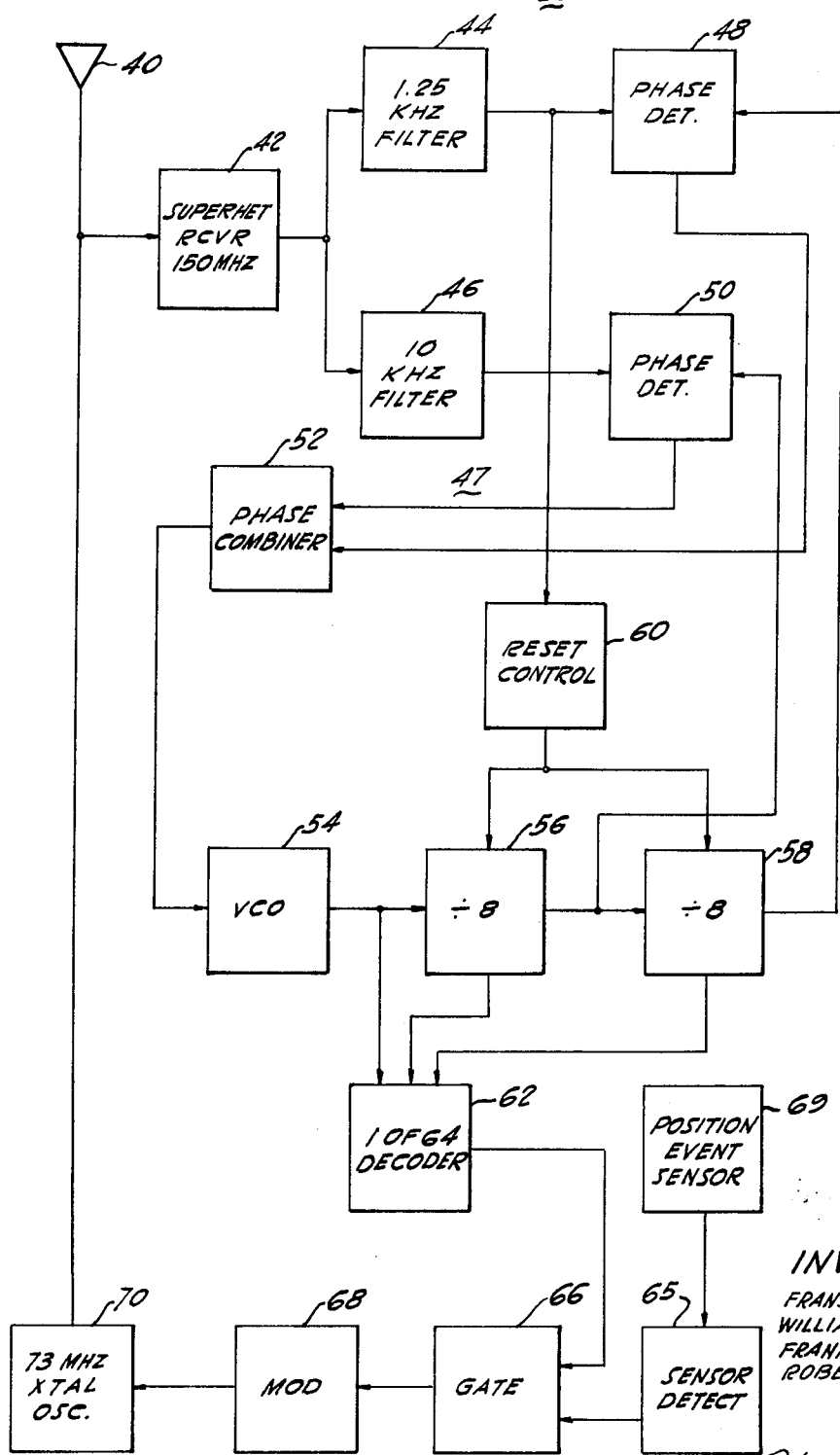
FIG. 2 is a block diagram in greater detail of a vehicle transponder to be used in the system of FIG. 1.

Reference is now made to Fig. 2 wherein the components making up each transponder 26 carried by a racing vehicle is shown. The transponder 26 receives the sync signal transmitted from the stationary master transmitter 32 via an antenna 40 and a superheterodyne receiver 42 tuned to the RF carrier frequency of the sync signal transmitter 32. The 1.25 kilohertz sync signal and the 10 kilohertz signal are used to synchronize the transponder in proper time relationship with the transmitted signal and, therefore, with the central control circuits. The 1.25 kilohertz and the 10 kilohertz signals at the outputs of the respective filters 44, 46 are used as coarse and fine correction signals in a phase locking loop 47 comprising phase detectors 48, 50, phase combiner 52, voltage control oscillator 54 and divide-by-eight counting circuits 56, 58. The phase detectors 48, 50 compare the phase of the incoming signals with the phase of the 1.25 kilohertz and 10 kilohertz signals at the output of the divide-by-eight counters 58 and 56 respectively, and send signals to the phase combiner 52 in accordance with the respective phase differences. The phase combiner 52 provides a voltage signal to the voltage controlled oscillator 54 which is designed to generate an 80 kilohertz signal when the generated 1.25 kilohertz and 10 kilohertz signals are in proper phase relationship with the incoming signals.

A divide-by-eight counter 56 divides the 80 kilohertz signal to produce the 10 kilohertz generated signal and another divide-by-eight counter 58 divides the 10 kilohertz signal to produce the 1.25 kilohertz signal at its output. In addition, a reset control 60 is provided which operates to reset the counter 56, 58 to zero at the beginning of each cycle of the received 1.25 kilohertz signal so as to synchronize the transponder counter 56, 58 with the counters 33 and 35 in the central control 30.

Thus, the oscillator 54 and counters 56, 58 operate in the same well known manner as the corresponding components of the central control 30 to divide the 1.25 kilohertz sync signal into 64 equal time slots or counts. A decoder 62, which is connected and operative in a well known manner, selects a particular one of the 64 counts which is unique to that vehicle transponder and produces a signal on its output conductor 64 only during that unique time slot. The decoders 62 of the other vehicle transponders are connected to produce signals during different time slot portions of the sync signal so that no two vehicle transponders will provide a vehicle identifying decoder signal at the same time.

The vehicle identifying signal from decoder 62 serves as one input to a gate 66 which has its other input connected to a position event occurrence detector 65. A sensor 69 detects the event position indication provided by one of the particular locators 20, 22, 24 as the vehicle passes thereby and causes the detector 65 to relay a signal to the gate 66 at the time of the positional event occurrence. The simultaneous occurrence of the decode signal and the position detect signal causes gate 66 to actuate a modulator 68, and the modulator serves to trigger a crystal oscillator 70 to transmit a vehicle identifying positional event occurrence signal via the transponder antenna 40. The positional event signal occurs only during the unique time slot corresponding to the particular vehicle so that it may be properly identified by the central control. The power of the transponder transmitted signal is kept quite low so that it will be received only by the particular track side receiver 27, 28 or 29 positioned adjacent and corresponding to the particular positional event.

The accuracy of the system depends in a large measure on the frequencies selected for operation. By utilizing a sync signal frequency of 1.25 kilohertz each vehicle in the race is sampled every 800 microseconds. Thus, a vehicle travelling 200 miles per hour around the track will be sampled every 2.82 inches along its path and the system will be able to log vehicles passing a position event with a maximum error of 2.82 inches of the center of the position and each other.

The transponder transmitted signals received at the respective track side receivers are sent over appropriate conductors 71a, b, etc. (FIG. 3) to the central control 30 which would normally be located in the official race control center. A scoring processor and data formator 72 identifies the particular position event which is being scored by identifying the particular receiver 27, 28, etc., from which a reporting signal is received. It also identifies the particular vehicle reporting the positional event by comparing its time coincidence with the 64 vehicle coded count from the decoder 41. The scoring processor and data formator 72 also receives a signal input from the crystal oscillator controlled clock 74 so that the clock time of each positional event occurrence can be processed. After the data is formated, it is stored in a buffer storage 76 from which it may be entered into a computer 78 in a well known manner.

The computer 78 is programmable to compute all the necessary data for monitoring the race including the lap counts of each vehicle, the lap speeds, average speed for the race, racing rank of each vehicle, etc. In addition, the computer may be programmed with data from auxiliary inputs 79 pertaining to the vehicles, vehicle driver, etc. which may be posted on a display board 80 for spectator interest as desired. Pertinent data from the computer may also be provided to other output devices 82, such as cathode ray tube displays, printing mechanisms, etc., for use by the race officials in the control center. Furthermore, an output from the computer 78 may be used to control a photo-finish monitor 84 so that as each vehicle approaches the final lap count, a camera in the photo-finish monitor 84 may be prepared to photograph the vehicle as it crosses the start-finish line. As a backup safeguard for the system an additional tape recorder 86 may be connected to record the positional event occurrence data as it transpires during the race. Thus, in the event of any scoring problems, the race may be recreated by playing the recorded data to the computer to recompute any questioned data.

Reference is now made to FIGS. 4, 5 and 6 for a description of particular position event locator and sensor arrangements which may be used with the monitoring system. Such an arrangement must be capable of providing an accurately monitorable signal as the vehicle passes the monitor position at varying speeds. In the arrangement of FIG. 4, the event position is located by a magnetic field established around a conductor loop 90 having parallel sides 94, 96 which extend across the track 10 at positions equidistant from the event position line 12. The loop is energized by an alternating current generator 92 which may be operative at a frequency of perhaps 100 kilocycles. The conductors 94, 96 may be buried in the track 10 or extended thereabove so that they establish fluctuating magnetic fields which may be detected by the position event sensors 69 as the vehicles pass thereacross. Since the loop sides 94 and 96 are located equidistant on either side of the event position line 12, the horizontal components of the magnetic fields set up by conductors 94 and 96 exactly balance each other out at the line 12.

The horizontal components of the fields surrounding conductors 94, 96 may be sensed by a coil 100 forming the positional event sensor carried by each vehicle. The coil 100 is horizontally mounted in the vehicle parallel to the normal direction of travel so that an alternating current can be induced therein, the amplitude of which is proportional to the magnitude of the difference between the horizontal components of the fluctuating magnetic fields surrounding conductors 94, 96. Thus, as the sensor coil 100 moves into the magnetic field and towards the position event line 12, the amplitude of the signal generated therein will increase to a maximum amplitude when it is positioned directly over the leading conductor 94, reduces to a minimum as it approaches the line 12 at the position event line $t_{PE}$ and increases to a maximum again when it reaches conductor 96. The nature of the signal induced in coil 100 is indicated in waveform 102.

The remainder of the circuitry shown in FIG. 4 detects the occurrence of the particular waveform signal 102 established in the coil 100 whereby a maximum amplitude signal is followed by a minimum amplitude signal and produces an output signal only at the occurrence of that minimum amplitude signal. The A.C. signal generated in coil 100 is amplified by a high gain amplifier 104 which also clips the amplitude before presenting it to the diode rectifier 106 and an amplitude detection circuit comprising capacitor 108 and resistor 110. Therefore, the demodulated signal appearing at junction 112 is represented by the waveform 114 which goes positive as the vehicle approaches the position of the position event line 12, falls to a minimum at the position of that line, and goes positive again as it departs from the position of that line. This signal is transmitted through a buffer amplifier 116 and through two separate circuit paths to the two inputs of an And gate 118. The first of the separate circuit paths comprises a resistor 120 and capacitor 122 which filter out the high frequency components of the signal. Thus, the negative going spike at the time of the position event occurrence is removed, as indicated in waveform 124. The second circuit path comprises an amplifier 126 which operates as a threshold detector and signal inverter. The threshold detector operates to rapidly change state from one voltage output to another as its input thresholds are reached to produce a waveform such as shown at 128. This waveform, therefore, defines the position event occurrence time as a narrow pulse having a sharply rising leading edge and a sharply falling lagging edge. The two signals 124 and 128 are anded in gate 118 produce a signal at the output conductor 130 having the waveform shown at 132 with a signal narrow pulse occurring at the position event occurrence time $t_{PE}$.

FIG. 5 shows another arrangement which might be used for the position event locator and position event sensor. This arrangement comprises a single conductor 134 extending transversely across the track and energized by an alternating current generator 92. In this case, the opposite end of the conductor 134 must have a ground return to the other terminal of the generator 92 which may take the form of an earth ground return or another conductor perhaps in the same slot in the track 10 in which the conductor 134 is located. The sensor in this case comprises a two winding coil 136, the windings being connected in opposition with their axes aligned in a horizontal direction parallel to the direction of travel of the vehicle. Again in this arrangement the sensor is operating responsive to the horizontal component of the fluctuating magnetic field emanating from the conductor 134 so that it will produce signals such as shown in waveform 102 of FIG. 4 as the vehicle approaches the position event location. This, of course, is because when the coil 136 is centered with respect to conductor 134, the current induced in the two windings cancel each other out to produce a minimum signal thereat.

The arrangement in FIG. 6 will also produce a signal similar to waveform 102. This one uses the same single conductor configuration for the position of that locator shown in FIG. 5, but utilizes a single winding coil 138 arranged in the vehicle to have its polarity axis in a vertical position. The vertical component of the magnetic field emanating from conductor 134 induces the signal in the vertical coil 138 and, thus, will produce the same sort of signals as the other two arrangements previously discussed. The arrangement as shown in FIG. 5 is perhaps the most suitable because the differentially wound coil inherently cancels noise created by any extraneous magnetic field sources.

It is to be noted that the position event locator and sensor arrangements shown in FIGS. 4, 5 and 6 might have applications other than in vehicle race monitoring systems. For example, they might be used to aid truck drivers in backing up their trucks to shipping docks or the like without the help of another observer. The position event locator with its fluctuating magnetic field may be located near the shipping dock and the sensing coil, a sensor detector, may be located near the rear end of the truck. A signalling device operative responsive to the output of the And gate 118 may be provided in the truck cab to signal the driver when he has arrived at the proper position.

Furthermore, although the monitoring system has been described as it applies to the scoring of a vehicle race, it could very well be adapted to many other uses wherein it is desirable to monitor the positional events of moving bodies. For example, it might be used to monitor the activity of patrolling guards or police as they drive their vehicles around their established beats or to monitor road traffic under certain conditions. Therefore, while a preferred application and embodiment of the invention has been disclosed, it is intended its scope should be determined only by the appended claims.

What is claimed is:

1. A system for monitoring the positional events of a plurality of racing bodies comprising means along the racing path defining each positional event, means carried by each racing body for sensing the real time occurrence of each positional event, means for providing a sync signal, means carried by each body operative responsive to said sync signal for time dividing said sync signal and providing a racing body indicating signal during one of said time divisions unique to that racing body, means responsive to the simultaneous occurrence of a racing body indicating signal and the sensing of a positional event of said racing body for providing a positional event occurrence signal, and means synchronized with said sync signal and in receipt of the positional event occurrence signal from each racing body for providing usable data regarding the occurrences of the positional events of each racing body.

2. The system of claim 1 wherein said sync signal providing means comprises a master oscillator, means for repetitively counting the periods of said master oscillator up to a predetermined count at least equal to the number of racing bodies and resetting to zero, and means for transmitting the sync signal at the frequency of the counting means reset.

3. The system of claim 2 wherein each of said racing body time dividing and indicating signal means comprises a receiver for said sync signal, an oscillator, means for repetitively counting the periods of said variable frequency oscillator up to said predetermined count and resetting to zero means for synchronizing said variable frequency oscillator and racing body counting means with said sync signal, and means for providing said racing body indicating signal during a preselected count of said racing body counter.

4. The system of claim 3 wherein said racing body oscillator is a variable frequency oscillator, and said synchronizing means comprises means for providing a signal when said racing body counting means resets to zero, and means responsive to the phase difference between said reset signal and said sync signal for adjusting said variable frequency oscillator to said sync signal frequency.

5. In the system of claim 3 wherein said real time positional event occurrence signal means comprises a transmitter carried by said racing body, and wherein said usable data providing means comprises a receiver adjacent each event position for receiving the event occurrence signal from the racing body as it passes thereby, means for providing a signal for each count of said master oscillator counter, and means operative responsive to the time relationship of said count signal and said positional event signals for determining the racing body passing each positional event.

6. In the system of claim 5 wherein said usable data providing means comprises a real time clock and means for computing time and positional event relationship data.

7. The system of claim 1 wherein said positional event defining means comprises means for establishing a periodically fluctuating magnetic field the polarity orientation of which remains fixed to define said positional event and wherein said sensing means comprises an inductance the polarity orientation of which is adapted to be normally perpendicular to the polarity orientation of said magnetic field establishing means as said vehicle travels, and means for detecting minimum current in said inductance when said inductance is outside the magnetic field, maximum current when within the field approaching the event position and minimum current when at the event position.

8. The system of claim 7 wherein said magnetic field establishing means comprises a loop energized by an alternating current source having two sides extending parallel transverse to the direction of racing body travel, and wherein said inductance comprises a coil having its axis aligned with the direction of travel.

9. In the system of claim 7 wherein said field establishing means comprises a conductor extending transverse to the direction of travel energized by an A.C. source and wherein said inductance comprises a coil having its axis aligned substantially perpendicular to said conductor and the direction of travel.

10. In the system of claim 7 wherein said field establishing means comprises a conductor extending transverse to the direction of travel energized by an A.C. source and wherein said inductance comprises a pair of separated and differentially wound coils extending in the direction of travel.

11. A vehicle race monitoring system comprising means along the path of movement of the vehicles for defining predetermined positions, means in each vehicle for providing a position sensing signal at the time said vehicle passes said predetermined positions, means including a transmitter for providing a time divisible period sync signal, a receiver in each vehicle tuned to said transmitter, means in each vehicle for time dividing the received sync signal and for providing a vehicle indicating signal during one of said time divisions unique to that vehicle, means including a transmitter in each vehicle operative responsive to the simultaneous occurrence of a position sensing signal and a vehicle indicating signal for transmitting a position passing signal during said simultaneous occurrence, a receiver associated with each predetermined position for receiving the transmitted signal from each vehicle passing that position, and means operable responsive to the received vehicle signal and the sync signal for providing data relating to racing status of said vehicles.

12. A vehicle race monitoring system comprising a stationary sync signal transmitter, said sync signal transmitter comprising a master oscillator, means for repetitively counting the periods of said master oscillator up to a predetermined count at least equal to the number of racing vehicles and resetting to zero, means for generating a carrier wave, and means for modulating said carrier wave with an output signal derived from said counting means, means adjacent the racing path defining one or more positional events of a transponder carried by each of said vehicles, each of said transponders comprising means for providing a sensing signal whenever said vehicle passes a positional event defining means, a receiver tuned for receipt of said modulated carrier, a demodulator, a slave oscillator, means for repetitively counting the periods of said slave oscillator up to said predetermined count and resetting to zero, means including said demodulator for synchronizing said slave oscillator and counter with said master oscillator and counter, means for providing a vehicle identification signal during a predetermined count of said vehicle counting means unique to that vehicle, and means including a transmitter for transmitting a positional event occurrence signal during the simultaneous occurrences of said sensing signal and said vehicle identification signal; and stationary data handling means comprising a receiver for said positional event occurrence signals adjacent said racing path at said event positions, means responsive to the receipt of said positional event occurrence signal and to said stationary counter for logging each positional event occurrence of each vehicle, and means for computing and displaying usable racing data from the logged information.

13. The system of claim 12 wherein said positional event defining means comprises means for establishing a periodically fluctuating magnetic field, and wherein said sensing signal providing means comprises an indicator the polarity orientation of which is adapted to be normally perpendicular to the polarity orientation of said magnetic field establishing means as said vehicle travels, and means for detecting minimum current in said inductance when said inductance is outside the magnetic field, maximum current when within the field approaching the event position and minimum current when at the event position.

14. The system of claim 13 wherein said magnetic field establishing means comprises a loop energized by an alternating current source having two sides extending parallel transverse to the direction of racing body travel, and wherein said inductance comprises a coil having its axis aligned with the direction of travel.

15. In the system of claim 13 wherein said field establishing means comprises a conductor extending transverse to the direction of travel energized by an A.C. source and wherein said inductance comprises a coil having its axis aligned substantially perpendicular to said conductor and the direction of travel.

16. In the system of claim 13 wherein said field establishing means comprises a conductor extending transverse to the direction of travel energized by an A.C. source and wherein said inductance comprises a pair of separated and differentially wound coils extending in the direction of travel.

17. A system for sensing the occurrence of a positional event of a vehicle travelling along a path comprising means adjacent the path of travel of said vehicle for establishing a periodically fluctuating magnetic field the polarity orientation of which remains fixed to define said positional event, an inductance carried by said vehicle the polarity orientation of which is adapted to be normally perpendicular to the polarity orientation of said magnetic field establishing means as said vehicle travels, and means for detecting minimum current in said inductance when said inductance is outside of the magnetic field, a maximum current when in the field approaching the event position and minimum current when at the event position.

18. The system of claim 17 wherein said magnetic field establishing means comprises a loop energized by an alternating current source having two sides extending parallel transverse to the direction of racing body travel, and wherein said inductance comprises a coil having its axis aligned with the direction of travel.

19. In the system of claim 17 wherein said field establishing means comprises a conductor extending transverse to the direction of travel energized by an A.C. source and wherein said inductance comprises a coil having its axis aligned substantially perpendicular to said conductor and the direction of travel.

20. In the system of claim 17 wherein said field establishing means comprises a conductor extending transverse to the direction of travel energized by an A.C. source and wherein said inductance comprises a pair of separated and differentially wound coils extending in the direction of travel.

* * * * *